United States Patent
Bravo et al.

(10) Patent No.: US 8,056,466 B2
(45) Date of Patent: Nov. 15, 2011

(54) PNEUMATIC ACTUATOR, IN PARTICULAR FOR VALVES

(75) Inventors: Tiziano Bravo, Rodengo Saiano (IT); Alessandro Pasquali, Rodengo Saiano (IT)

(73) Assignee: OMAL S.p.A., Brescia (IT)

( * ) Notice: Subject to any disclaimer, the term of this patent is extended or adjusted under 35 U.S.C. 154(b) by 321 days.

(21) Appl. No.: 12/445,628

(22) PCT Filed: Oct. 11, 2007

(86) PCT No.: PCT/IT2007/000711
§ 371 (c)(1), (2), (4) Date: Apr. 15, 2009

(87) PCT Pub. No.: WO2008/047396
PCT Pub. Date: Apr. 24, 2008

(65) Prior Publication Data
US 2010/0294963 A1  Nov. 25, 2010

(30) Foreign Application Priority Data
Oct. 20, 2006  (IT) .............................. BS2006A0186

(51) Int. Cl.
*F16K 31/163* (2006.01)
(52) U.S. Cl. ............... 92/13.8; 92/136; 92/138; 251/58; 251/285; 251/288
(58) Field of Classification Search ............. 251/58, 251/285, 286, 287, 288; 92/136, 138, 13.8
See application file for complete search history.

(56) References Cited

U.S. PATENT DOCUMENTS

| | | | | |
|---|---|---|---|---|
| 3,148,595 A * | 9/1964 | Looney | | 92/11 |
| 3,537,358 A * | 11/1970 | Bunyard | | 92/136 |
| 3,672,260 A * | 6/1972 | Gachot et al. | | 92/69 R |
| 4,260,128 A * | 4/1981 | Tito | | 251/58 |
| 4,564,169 A * | 1/1986 | Nordlund | | 251/58 |
| 4,566,670 A * | 1/1986 | Nordlund | | 251/58 |
| 4,651,626 A * | 3/1987 | Messina | | 92/13.6 |
| 4,949,936 A * | 8/1990 | Messina | | 251/58 |
| 4,970,944 A * | 11/1990 | Killian | | 92/13.6 |
| 5,014,598 A * | 5/1991 | Champagne | | 92/13.5 |
| 5,325,888 A * | 7/1994 | Stary | | 137/553 |
| 5,842,404 A * | 12/1998 | Triado Isern et al. | | 92/13.6 |
| 6,371,439 B1 * | 4/2002 | Trevisan | | 251/58 |

FOREIGN PATENT DOCUMENTS

| | | |
|---|---|---|
| EP | 0 344 126 | 11/1989 |
| EP | 0 976 931 | 2/2000 |
| SE | WO 84/03129 | 8/1984 |
| WO | WO 2007/057927 | 5/2007 |

* cited by examiner

Primary Examiner — John Bastianelli
(74) Attorney, Agent, or Firm — McGlew and Tuttle, P.C.

(57) ABSTRACT

The invention concerns pneumatic actuators for valves comprising a body closed by head flanges, two pistons moving in said body in opposite directions, an output shaft that turns actuated by the pistons, and a stop device on each head flange to limit the stroke of the pistons when they move away from each other towards the head flanges. On at least one side of the actuator body an adjusting device (22) is provided which includes stop means (26, 27) at varying distances from each other in a direction parallel to the movement of the pistons and arranged in a position to intercept and limit the stroke of the pistons when the latter move towards each other.

10 Claims, 3 Drawing Sheets

PNEUMATIC ACTUATOR, IN PARTICULAR FOR VALVES

FIELD OF THE INVENTION

This invention concerns pneumatic actuators mainly for controlling ball, butterfly and similar valves equipped with a shutter member usually turning through an angle of 90° between a closed and complete open position. This invention refers in particular to an innovative system to adjust the stroke of such pneumatic actuators to stop a valve shutter member both in the closed position and in different open positions.

STATE OF THE TECHNIQUE

Pneumatic actuators of the type here considered which include a actuator body closed by head flanges, two pistons guided in said body and moving in opposite directions, an outlet shaft are already known, wherein said shaft turns operated by the pistons and is connected to the shutter member of valve to be opened or closed in response to the signals received from remote controllers.

Pistons are kinematically joined to the outlet shaft by means of a gear or a turning element to transform the rectilinear movement of the pistons into rotary alternate motion of the outlet shaft. In this way, for example, the stroke of the pistons in one direction corresponds to a turn of the shaft to open the shutter member of the valve connected to it, whereas the stroke of the pistons in the opposite direction corresponds to the closure of said valve shutter member.

When for any functional reason, regarding closure or to compensate wear, should the valve shutter member, ball valve, butterfly valve and the like require a rotation different than 90° between the opening and closing positions and vice versa, the piston strokes and likewise the rotation of the outlet shaft, must be conveniently adjustable in order for the valve to operate correctly.

For this type of regulation various systems have been proposed and adopted up to now.

One of these systems uses at least a stop device that turns with the outlet shaft of the actuator and which is designed to interact alternatively with two stop screws to set respectively the opening and closing strokes of the valve. The stop devices can be made up of cams, pegs or shoulders protruding radially from the outlet shaft, whereas the stop screws are positioned and screwed into one side of the actuator body with the possibility of changing the position depending on the stop devices used.

Another known stop system comprises an adjusting screw that is connected to and moves with a piston and which, when moving in one direction, comes into contact with the turning element that connects the pistons to the outlet shaft and, when moving in the other comes into contact with a head flange of the actuator body.

At least in the first case, however, the stress and stop forces when opening a valve shutter member are released onto the outlet shaft and, consequently, onto the turning element of the kinematic coupling of the shaft with the control pistons to the detriment of the precision and duration of the device.

A further stop system comprises two adjusting screws positioned on the head flanges of the actuator body: one screw positioned in line with and which comes into contact with a first piston and the other screw in line and interacting with a second piston. In this way it is possible to adjust both the opening and closing strokes of a valve.

However, the stop involves one piston at a time, one when opening and the other when closing, with the stop forces that release onto one or the other head flange without any spreading of the stress acting on the two pistons.

OBJECTS AND SUMMARY OF THE INVENTION

This invention on the other hand is aimed at eliminating the above known technical problems and drawbacks addressed above and at creating the conditions for a precise and correct adjustment of the strokes of a pneumatic actuator using easily accessible and easy to adjust devices.

In fact one of the objectives of the invention is to propose and supply a pneumatic actuator designed in particular for valves which incorporate an adjusting system of the opening and closing strokes aimed at protecting the more delicate and vitally important coupling areas between the pistons and the outlet shaft as regards to operation purposes and duration of the actuator.

For this reason the invention proposes an original arrangement of the adjusting devices of the piston strokes depending on the rotation angle of the valve shutter member to be controlled and at the same time establishes the conditions so that the stop forces of the pistons at the end of the stroke release in one direction onto the end flanges of the actuator body and in the other direction onto the two pistons that oppose each other, uniformly without affecting the outlet shaft.

The objective and the above conditions are achieved with a pneumatic actuator according to the preamble of claim 1 and characterised by the fact that from at least one side of the actuator body there is an adjusting device inserted including two stop devices the distance of which is variable according to a direction parallel to the movement of the pistons and each one of which is associated with a piston, said stop devices being in a position in which they can intercept said pistons so as to control the limit of their approach stroke.

BRIEF DESCRIPTION OF THE DRAWINGS

Greater details of the invention will however become evident from the following description made in reference to the attached indicative and not limiting drawings, in which.

DETAILED DESCRIPTION OF THE INVENTION

Figure 1:
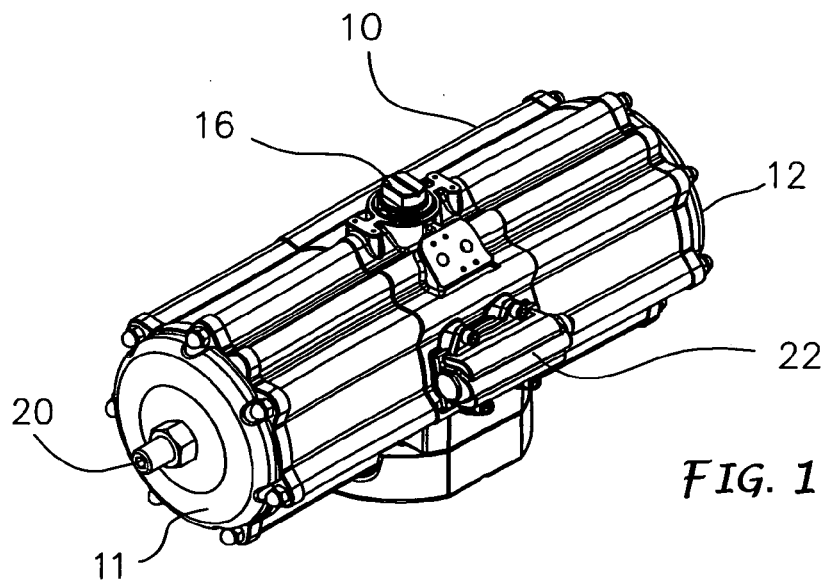
FIG. 1 is a view in perspective of the actuator seen from the outside.
Figure 2:
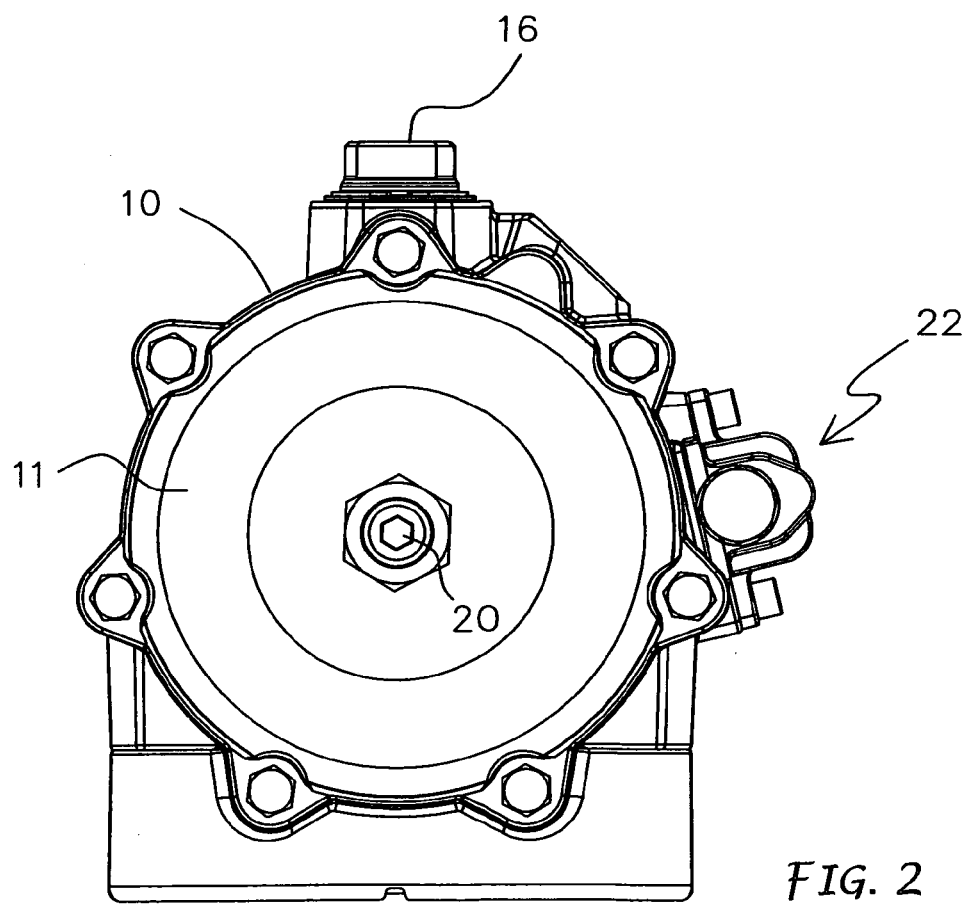
FIG. 2 is a view from an end of the actuator in FIG. 1.

As shown, the pneumatic actuator comprises, as is well known, an actuator body 10 closed by head flanges 11, 12 to form a chamber 13; two pistons 14, 15 housed and sliding in said chamber; and an outlet shaft 16 placed at a right angle between the two pistons, rotatably supported in said body and connectable to the turning shutter member of a valve to be operated—not shown.

Figure 3:
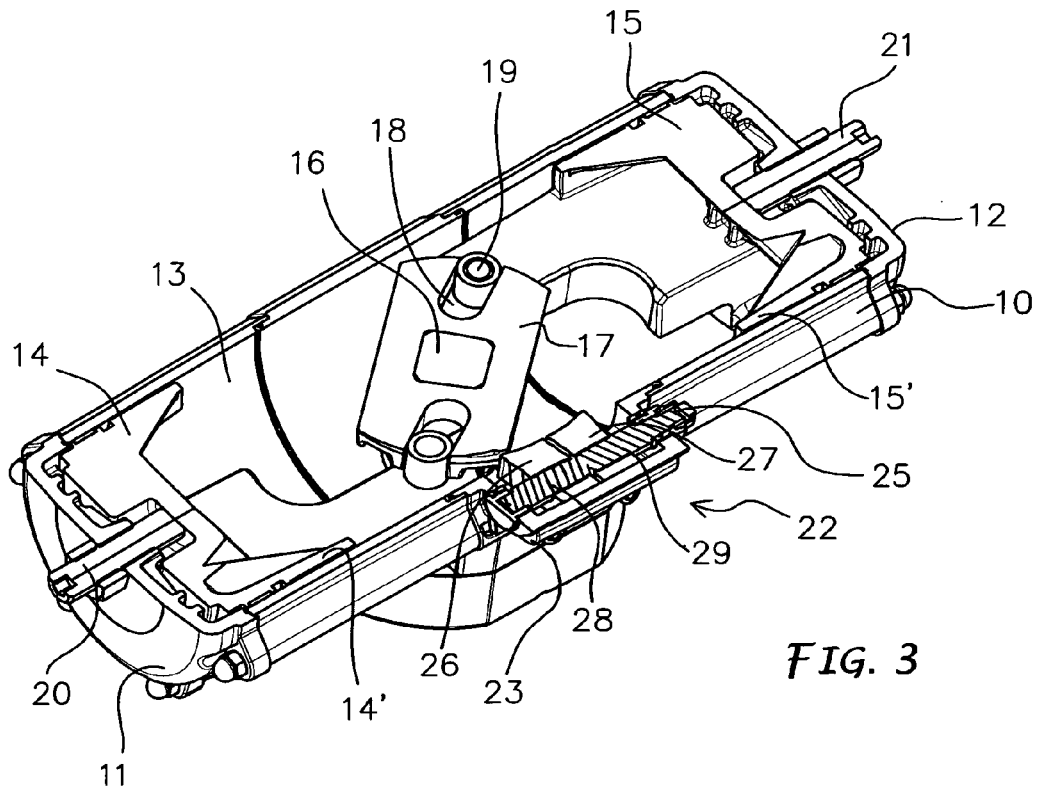
FIG. 3 is a longitudinal section of the actuator in a position corresponding to the closure of the controlled valve and with an adjusting device in a first position.
Figure 4:
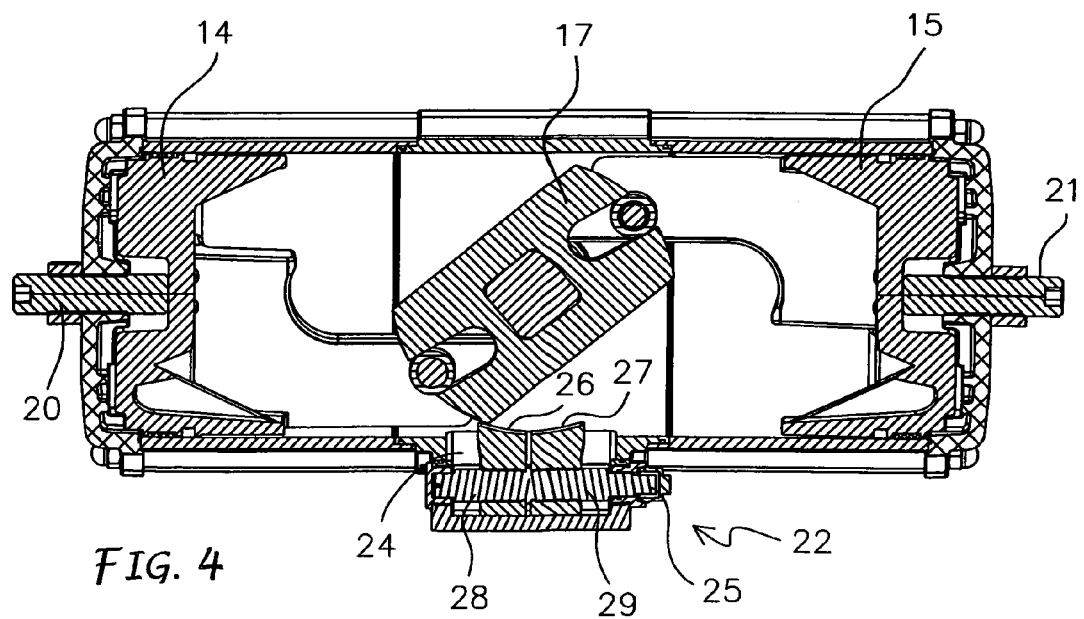
FIG. 4 is a plan view of the assembly in FIG. 3.
Figure 6:
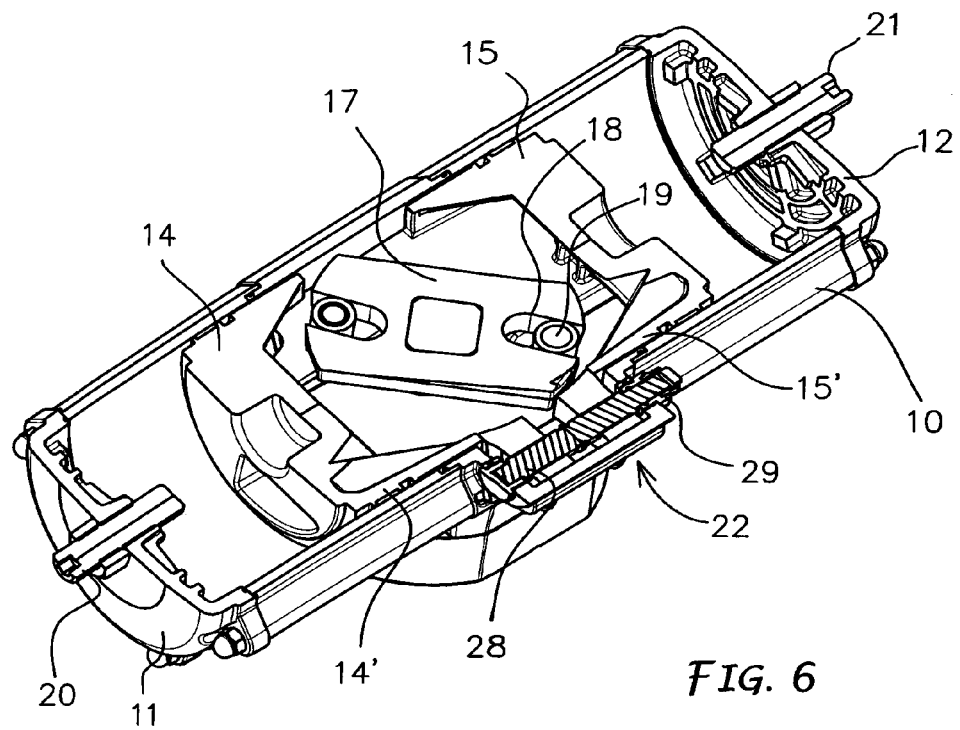
FIG. 6 is a longitudinal section of the actuator in the position corresponding to the opening of the controlled valve, but with adjusting device in a different position.
Figure 5:
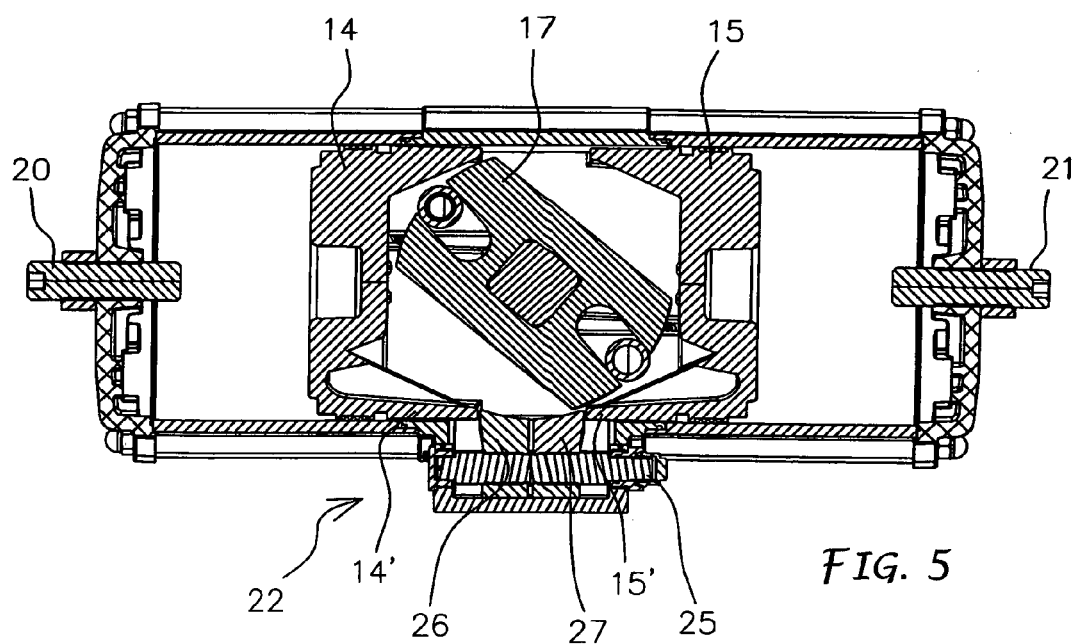
FIG. 5 is a view similar to the one in FIG. 4, but with the actuator in a position corresponding to the opening of the controlled valve.

Pistons 14, 15 are moveable in opposite directions to each other to move away from and approach in parallel by means of a fluid under pressure fed as required into the chamber 13 of the actuator body 10 and to actuate the outlet shaft 16 through a turning connecting member 17. In the example shown, this connecting member 17 is a link motion, keyed centrally to the outlet shaft 16, and having two slots 18 in its opposite ends by means of which it unites with corresponding pins 19 fixed to a part of each piston, so that the movement of the pistons corresponds to the rotation of the outlet shaft. In particular, when the pistons move towards the head flanges, moving away from each other (FIGS. 3 and 4), the outlet shaft 16 turns in the direction to close the valve shutter member it is connected to: when the pistons move to approach each other (FIGS. 5 and 6), the outlet shaft 16 turns in the direction to open the valve shutter member, or it can be vice versa. A first adjusting screw 20 is assembled on a test flange 11 in line to intercept and stop a first piston 14 when the latter moves towards said flange. In the same way, a second adjusting screw 21 is mounted on the other head flange 12 in line to intercept and stop a second piston 15 when the latter moves towards the other flange. Therefore, by adjusting the position of the adjusting screws 20, 21 as required it is possible to limit the stroke of the pistons when they move away from each other in the direction, for example, to close the actuated valve.

In compliance with the invention, pistons 14, 15 are equipped with longitudinal tailpieces 14', 15', respectively, facing each other, and on a side of the actuator body 10, in a position included between said tailpieces 14', 15', there is mounted an adjusting device 22 designed to change the stroke of the pistons by adjusting it even when they are moving towards each other, that is to say, for example, in the opening direction of the actuated valve.

The device 22 comprises a supporting element 23, that is fixed to the actuator body 10 and forms a housing 24 open towards the inside of said body and in which is mounted an adjusting screw 25 with two stop blocks 26, 27 associated with a first piston 14 and the other to the second piston 15. The adjusting screw 25 is held in the supporting element 23 so as to be able to turn only when operated by a suitable spanner. It is substantially parallel to the direction of the movement of the pistons and has a section with right-hand threading 28 and a section with left-hand threading 29. The two stop blocks 26, 27 are respectively conjugated with the right-hand threaded section 28 and the left-hand threaded section 29 of said adjusting screw 25, they are guided in the support element 23 with the possibility of translating in opposite directions, but without turning, in response to the rotation of the adjusting screw, and are facing towards the inside of the actuator body in a position to intercept the tailpieces 14', 15' of the pistons 14, 15 when the latter come close to each other.

Practically, on one hand, and as said beforehand, by operating on the first and on the second adjusting screws 20 and 21 fixed to the head flanges of the body 10 it is possible to set the strokes of the pistons 14, 15 in the direction of their away movement corresponding to the closing (or opening) of the actuated valve. On the other hand with a rotation of the adjusting screw 25 it is possible to vary the parallel position of the stop blocks 26, 27 in opposite directions to vary the distance between them (FIG. 6) and to correspondingly limit the pistons approach stroke according to requirements, and however depending on the opening (or closing) angle of the actuated valve.

Preferably then, the whole, made up of the screw 25 with the stop blocks 26-27 is arranged in the support element 23 with a certain degree of freedom in the axial direction, consequently with the possibility of translating parallel to the longitudinal axis of the body 10, so that it can always take on a self-centering position compared to the position of the tailpieces 14' e 15' of pistons 14 and 15, quite apart from the possible play and working tolerances of the integrating parts and without the body 10 or the supporting device 23 encountering longitudinal stops or limits. Furthermore, this possibility to translate also guarantees that the reaction forces to the thrust of the pistons on the stop blocks 26, 27 are almost completely released on said assembly without the body 10 and the support 23 being affected by significant mechanical stress. Also important to be aware of is that the actuator described beforehand and represented in the enclosed drawings is the double-acting type, but the adjusting device of the approach stroke of the pistons is applicable in the same way and gives the same results and advantages should the actuators be simple-acting, or should the pistons of the actuators have a toothed rack that mesh with a pinion integral with the outlet shaft designed to actuate the opening and closing of the shutter member of a valve.

The invention claimed is:

1. A pneumatic actuator, comprising:
an actuator body closed by head flanges and defining a chamber;
two pistons housed in said chamber and moving in parallel in opposite directions powered by a fluid under pressure to move said pistons away from or towards each other; and
an output shaft rotatably supported in said body, connectable to the shutter member of a valve to be operated and actuated to turn by said two pistons through means of transforming a rectilinear movement into rotary motion, wherein two adjusting screws are mounted on the head flanges of the actuator body, one for each flange, in a position to intercept and stop the pistons when said pistons move away from each other, wherein from at least one side of the body of the actuator an adjusting device is provided which includes stop means at a variable distance from each other, in a direction parallel to the movement of the pistons and each associated with a piston, said stop means being in a position to intercept said pistons for a restriction controlled by approach stroke of said pistons, wherein the adjusting device comprises a supporting element fixed to the actuator body and forming a housing open towards the inside of said body, an adjusting screw supported by said housing parallel to the movement direction of the pistons with only the possibility to turn, and having a right-threaded and a left-threaded section, and in which said stop means comprises two blocks respectively conjugated with the right-hand threading section and the left-hand threading section of the threading of the adjusting screw, moveable in parallel in opposite directions to vary a distance between said blocks in response to the rotation of said screw and designed to intercept the tailpieces of said pistons.

2. Pneumatic actuator according to claim 1, wherein each piston has a longitudinal tailpiece facing towards the one of the other piston, the adjusting device has two stop means in an adjustable position facing towards the pistons and intercepting said tailpieces when the pistons move in parallel towards each other.

3. Pneumatic actuator according to claim 1, wherein the support element of the adjusting device is associated and fixed to the actuator body.

4. Pneumatic actuator according to claim 1, wherein the support element of the adjusting device is an integral part of the actuator body.

5. A pneumatic actuator, comprising:
an actuator body closed by head flanges and defining a chamber;

two pistons housed in said chamber and moving in parallel in opposite directions powered by a fluid under pressure to move said pistons away from or towards each other; and an output shaft rotatably supported in said body, connectable to the shutter member of a valve to be operated and actuated to turn by said two pistons via means of transforming a rectilinear movement into rotary motion, wherein two adjusting screws are mounted on the head flanges of the actuator body, one for each flange, in a position to intercept and stop the pistons when said pistons move away from each other, wherein from at least one side of the body of the actuator an adjusting device is provided which includes stop means at a variable distance from each other, in a direction parallel to the movement of the pistons and each associated with a piston, said stop means being in a position to intercept said pistons for a restriction controlled by approach stroke of said pistons, wherein the adjusting device comprises a supporting element fixed to the actuator body and forming a housing open towards the inside of said body, an adjusting screw supported by said housing parallel to the movement direction of the pistons such that said adjusting screw turns, and said adjusting screw having a right-threaded and a left-threaded section, and said stop means comprising two blocks respectively conjugated with the right-hand threading section and the left-hand threading section of the threading of the adjusting screw, moveable in parallel in opposite directions to vary a distance between said blocks in response to the rotation of said screw and to intercept the tailpieces of said pistons, said adjusting screw with the stop blocks being supported in the support element with a limited degree of translation parallel to the movement direction of the pistons.

6. A pneumatic actuator, comprising:

an actuator body closed by head flanges and defining a chamber;

two pistons housed in said chamber and moving in parallel in opposite directions powered by a fluid under pressure to move said pistons away from or towards each other; and an output shaft rotatably supported in said body, connectable to the shutter member of a valve to be operated and actuated to turn by said two pistons via means of transforming a rectilinear movement into rotary motion, wherein two adjusting screws are mounted on the head flanges of the actuator body, one for each flange, in a position to intercept and stop the pistons when said pistons move away from each other, wherein from at least one side of the body of the actuator an adjusting device is provided which includes stop means at a variable distance from each other, in a direction parallel to the movement of the pistons and each associated with a piston, said stop means being in a position to intercept said pistons for a restriction controlled by approach stroke of said pistons, wherein the adjusting device comprises a supporting element fixed to the actuator body and forming a housing open towards the inside of said body, an adjusting screw supported by said housing parallel to the movement direction of the pistons such that said adjusting screw turns, and said adjusting screw having a right-threaded and a left-threaded section, and said stop means comprising two blocks respectively conjugated with the right-hand threading section and the left-hand threading section of the threading of the adjusting screw, moveable in parallel in opposite directions to vary a distance between said blocks in response to the rotation of said screw and to intercept the tailpieces of said pistons, said support element of the adjusting device being fixed to the actuator body.

7. A pneumatic actuator, comprising:

an actuator body closed by head flanges and defining a chamber;

two pistons housed in said chamber and moving in parallel in opposite directions powered by a fluid under pressure to move said pistons away from or towards each other; and an output shaft rotatably supported in said body, connectable to the shutter member of a valve to be operated and actuated to turn by said two pistons via means of transforming a rectilinear movement into rotary motion, wherein two adjusting screws are mounted on the head flanges of the actuator body, one for each flange, in a position to intercept and stop the pistons when said pistons move away from each other, wherein from at least one side of the body of the actuator an adjusting device is provided which includes stop means at a variable distance from each other, in a direction parallel to the movement of the pistons and each associated with a piston, said stop means being in a position to intercept said pistons for a restriction controlled by approach stroke of said pistons, wherein the adjusting device comprises a supporting element fixed to the actuator body and forming a housing open towards the inside of said body, an adjusting screw supported by said housing parallel to the movement direction of the pistons such that said adjusting screw turns, and said adjusting screw having a right-threaded and a left-threaded section, and said stop means comprising two blocks respectively conjugated with the right-hand threading section and the left-hand threading section of the threading of the adjusting screw, moveable in parallel in opposite directions to vary a distance between said blocks in response to the rotation of said screw and to intercept the tailpieces of said pistons, said support element of the adjusting device being an integral part of the actuator body.

8. A pneumatic actuator, comprising:

an actuator body closed by head flanges and defining a chamber;

two pistons housed in said chamber and moving in parallel in opposite directions powered by a fluid under pressure to move said pistons away from or towards each other; and an output shaft rotatably supported in said body, connectable to the shutter member of a valve to be operated and actuated to turn by said two pistons via means of transforming a rectilinear movement into rotary motion, wherein two adjusting screws are mounted on the head flanges of the actuator body, one for each flange, in a position to intercept and stop the pistons when said pistons move away from each other, wherein from at least one side of the body of the actuator an adjusting device is provided which includes stop means at a variable distance from each other, in a direction parallel to the movement of the pistons and each associated with a piston, said stop means being in a position to intercept said pistons for a restriction controlled by approach stroke of said pistons, each piston having a longitudinal tailpiece facing towards the one of the other piston, said adjusting device having two stop means in an adjustable position facing towards the pistons and intercepting said tailpieces when the pistons move in parallel towards each other, wherein said adjusting device comprises, a supporting element fixed to the actuator body and forming a housing open towards the inside of said body, an adjusting screw supported by said housing parallel to the movement direction of the pistons with only the possibility to turn, and said adjusting screw having aright-threaded and a left-threaded section, and said stop means comprising two blocks respectively conjugated with the right-hand threading section and the left-hand threading section of the threading of the adjusting screw, moveable in parallel in opposite directions to vary a distance between said blocks in response to the rotation of said screw and to intercept the tailpieces of said pistons.

9. A pneumatic actuator, comprising:
an actuator body closed by head flanges and defining a chamber;
two pistons housed in said chamber and moving in parallel in opposite directions powered by a fluid under pressure to move said pistons away from or towards each other; and
an output shaft rotatably supported in said body, connectable to the shutter member of a valve to be operated and actuated to turn by said two pistons via means of transforming a rectilinear movement into rotary motion, wherein two adjusting screws are mounted on the head flanges of the actuator body, one for each flange, in a position to intercept and stop the pistons when said pistons move away from each other, wherein from at least one side of the body of the actuator an adjusting device is provided which includes stop means at a variable distance from each other, in a direction parallel to the movement of the pistons and each associated with a piston, said stop means being in a position to intercept said pistons for a restriction controlled by approach stroke of said pistons, wherein the adjusting device comprises a supporting element fixed to the actuator body and forming a housing open towards the inside of said body, an adjusting screw supported by said housing parallel to the movement direction of the pistons such that said adjusting screw turns, and said adjusting screw having a right-threaded and a left-threaded section, and said stop means comprising two blocks respectively conjugated with the right-hand threading section and the left-hand threading section of the threading of the adjusting screw, moveable in parallel in opposite directions to vary a distance between said blocks in response to the rotation of said screw and to intercept the tailpieces of said pistons, said adjusting screw with the stop blocks being supported in the support element with a limited degree of translation parallel to the movement direction of the pistons, said support element of said adjusting device being fixed to the actuator body.

10. A pneumatic actuator, comprising:
an actuator body closed by head flanges and defining a chamber;
two pistons housed in said chamber and moving in parallel in opposite directions powered by a fluid under pressure to move said pistons away from or towards each other; and
an output shaft rotatably supported in said body, connectable to the shutter member of a valve to be operated and actuated to turn by said two pistons via means of transforming a rectilinear movement into rotary motion, wherein two adjusting screws are mounted on the head flanges of the actuator body, one for each flange, in a position to intercept and stop the pistons when said pistons move away from each other, wherein from at least one side of the body of the actuator an adjusting device is provided which includes stop means at a variable distance from each other, in a direction parallel to the movement of the pistons and each associated with a piston, said stop means being in a position to intercept said pistons for a restriction controlled by approach stroke of said pistons, wherein the adjusting device comprises a supporting element fixed to the actuator body and forming a housing open towards the inside of said body, an adjusting screw supported by said housing parallel to the movement direction of the pistons such that said adjusting screw turns, and said adjusting screw having a right-threaded and a left-threaded section, and said stop means comprising two blocks respectively conjugated with the right-hand threading section and the left-hand threading section of the threading of the adjusting screw, moveable in parallel in opposite directions to vary a distance between said blocks in response to the rotation of said screw and to intercept the tailpieces of said pistons, said adjusting screw with the stop blocks being supported in the support element with a limited degree of translation parallel to the movement direction of the pistons, said support element of said adjusting device being an integral part of said actuator body.

* * * * *

UNITED STATES PATENT AND TRADEMARK OFFICE
CERTIFICATE OF CORRECTION

PATENT NO. : 8,056,466 B2  
APPLICATION NO. : 12/445628  
DATED : November 8, 2011  
INVENTOR(S) : Tiziano Bravo and Alessandro Pasquali Page 1 of 1

It is certified that error appears in the above-identified patent and that said Letters Patent is hereby corrected as shown below:

Title Page, Item (30)

Foreign Application Priority Data "BS2006A0186"

should read -- BS2006A000186 --.

Signed and Sealed this
Twenty-first Day of February, 2012

David J. Kappos
*Director of the United States Patent and Trademark Office*